UNITED STATES PATENT OFFICE.

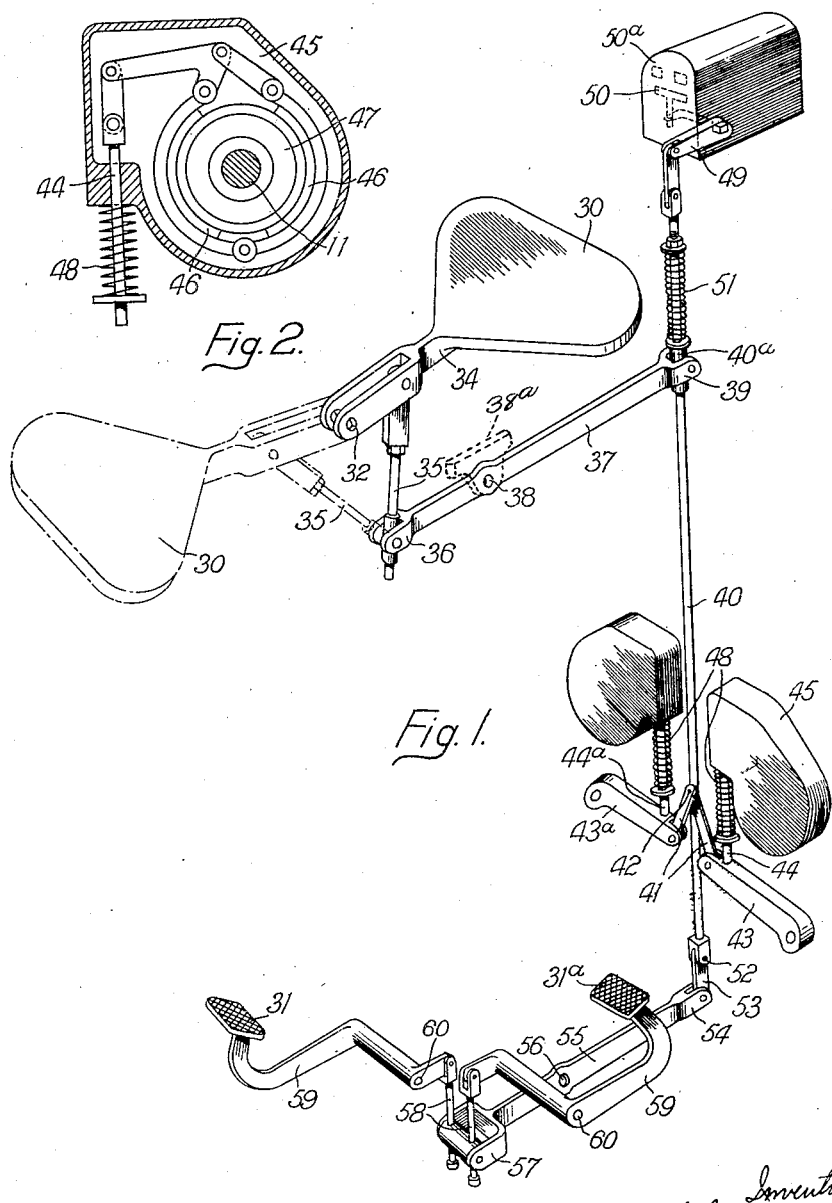

JOHN EDWARD HAMILTON, OF HARROW, ENGLAND.

ELECTRICALLY-DRIVEN LUGGAGE-TRUCK.

1,361,987. Specification of Letters Patent. Patented Dec. 14, 1920.

Original application filed July 5, 1916, Serial No. 107,696. Divided and this application filed October 14, 1918. Serial No. 258,093.

*To all whom it may concern:*

Be it known that I, JOHN EDWARD HAMILTON, a subject of the King of Great Britain, and a resident of Harrow, Middlesex, England, have invented certain new and useful Improvements in Electrically-Driven Luggage-Trucks, of which the following is a specification.

This invention relates to electrically driven luggage trucks of the type described in the specification accompanying my application for Patent Ser. No. 107696 filed July 5, 1916, of which this application is a division and has for its object to provide effective means for readily cutting off the power from the motor or motors and applying the brakes in the event of the driver leaving his normal driving position.

The present invention consists primarily of a particular combination and arrangement of parts constituting the arrangement of the automatic brakes which, as aforesaid, is automatically applied when the operator leaves his seat for any reason; the provision of mechanism for enabling the brakes to be applied by a lever or foot pedal when the operator is in his operative position; and the arrangement whereby the driver's seat can be thrown over to provide for driving and controlling in either direction of running through the same mechanism and controls.

In the accompanying drawings I have illustrated a vehicle constructed in accordance with and embodying the essential features of the invention, in which drawings:—

Figure 1, is a perspective diagrammatic view of the brake mechanism.

Fig. 2, being an enlarged sectional view through one of the brake drum casings.

Referring to the drawings, the numeral 30, indicates a pivoted seat which is so associated with the braking mechanism that the brake is automatically applied if the driver leaves his seat. The said pivoted seat 30, to which the brake is connected by a system of levers (hereinafter more specifically described) is so arranged that normally the brake is on, but is pulled off automatically by the weight of the driver when he takes his seat. In addition to this automatic arrangement I propose also to provide foot pedals 31 and 31ª adapted to be operated by the driver when upon his seat, so that the automatic brake can also be utilized as a service brake, or, alternatively, a second brake can be provided for use as a service brake.

It will be appreciated that the truck must have facilities for driving and control in either forward or reverse direction, and for this reason the driver's seat 30 is made reversible and can be thrown over about its pivot 32 according to whether it is desired to drive in a forward or reverse direction, and the arrangement is such that the same automatic brake operates in exactly similar fashion whether the seat is set to drive in the forward or reverse direction. When driving in the reverse direction the location of the pedal for service braking will not be convenient and for this reason the second pedal 31ª is provided which performs exactly the same function as its counterpart for use when driving forward. The same braking arrangement can be employed in both cases, a simple braking mechanism having the service brake pedals interconnected with the automatic braking mechanism being all that is necessary. The driver's seat 30 is pivoted at 32 on a suitable support. To the strut 34, supporting the seat proper 30, an adjustable coupling rod 35 is pivoted at one end and its other end is pivoted to one end 36 of a lever 37 pivoted at 38 to a suitable supporting bracket which is indicated at 38ª. The other end 39 of the lever 37 is pivoted to a sleeve 40ª slidable on the brake control rod 40 and links 41 coupled to a common pivot 42 on the rod 40 establish operative connection between such rod 40 and levers 43 and 43ª connected to rods 44 and 44ª of duplicate brakes 45 and 45ª. These brakes take the form illustrated in Fig. 2. A full downward movement of the rods 44 and 44ª cause the semi-circular brake shoes 46 to frictionally grip the brake drum 47 and when the rods 44 and 44ª are moved upward against the downward pressure exerted by the springs 48 the brake shoes 45 are released from engagement with the drum 47. A pivoted lever 49, operating an electrical cut-out switch 50 in the controller can be connected to the brake control rod 40 so that the bringing of the brakes into action automatically operates to cut off the supply of current to the motors irrespective of the position of the usual controller handle or lever. The casing of the controller is here indicated at 50ᵃ. When the driver is off the seat the springs 48 operate to put the brake on and it will be observed that when the weight of the driver is applied to the seat the spring 51 is compressed sufficiently to give an upward movement to the rod 40 sufficient to compress the springs 48 to take the brake off and operate the cut-out switch 50 to establish the motor circuit subject, of course, to control by the controller lever.

The lower end of the brake control rod 40 is pivotally connected at 52 to a link 53 which is pivoted to one end 54 of a lever 55 pivoted at 56 and connected at its other end 57 to couplings 58 connected to the service brake pedal levers 59 which are pivoted at 60.

The operation of the braking mechanism is as follows:—Assuming the driver to be off the seat the brakes are held on by the springs 48. Directly the driver gets on the seat the weight of the driver acting through the lever 37 will cause the sleeve 40ᵃ to rise and partially compress the spring 51 and cause the rod 40 to rise sufficiently to take the brakes off. If now either one of the service brake pedals 31 or 31ᵃ is depressed the rod 40 will be pulled down against the compression of the spring 51 and the brakes will be pulled on as will be readily understood.

What I claim and desire to secure by Letters Patent is:—

1. In an electrically driven luggage truck, an electric controller, a brake, a foot pedal, means connecting said foot pedal to the controller and brake whereby the same are operated simultaneously, a seat, means connecting said seat to the means connecting the controller and brake to the foot pedal, whereby the removal of the driver from the seat operates to cut off the supply of electricity and apply the brake.

2. In an electrically driven luggage truck, an electrical controller, a brake, a foot pedal, means connecting said foot pedal to the controller and brake whereby the same are operated simultaneously, a reversible seat for permitting operation in both directions of running, means connecting said seat to the means connecting the controller and brake to the foot pedal whereby the removal of the driver from the seat operates to cut off the supply of electricity and apply the brake.

3. In an electrically driven luggage truck having an electrical controller, a brake, a foot pedal and a reversible seat, a rod connecting the said pedal to the brake and controller, and a lever connecting the seat to the said rod, and means connecting the said lever and rod whereby said rod may be operated irrespective of the position of the seat.

4. In an electrically driven luggage truck having an electrical controller, a pair of brakes, a pair of foot pedals, and a pivoted reversible seat, a rod connecting such pedals to the brakes and the controller, a lever connecting the pivoted reversible seat to such rod and a spring whereby said rod may be operated by the pedals irrespective of the position of the seat.

5. In an electrically driven luggage truck having an electrical controller, a pair of brakes, a pair of foot pedals, and a pivoted reversible seat, and a rod connecting such pedals to the brakes, means for operating the brakes from the said rod comprising a pair of pivoted levers arranged one upon each side of the rod, links connecting the inner ends of said levers to the rod, and spring controlled members connecting the inner ends of said levers to the brakes.

In testimony whereof I affix my signature.

JOHN EDWARD HAMILTON.